United States Patent [19]
Dannöhl

[11] Patent Number: 5,558,141
[45] Date of Patent: Sep. 24, 1996

[54] APPARATUS FOR PRODUCING NITROGEN UNDER HIGH PRESSURE

[75] Inventor: Peter F. Dannöhl, Bottrop, Germany

[73] Assignee: Druckluft-Dannohl GmbH, Germany

[21] Appl. No.: 378,535

[22] Filed: Jan. 26, 1995

[30] Foreign Application Priority Data

Feb. 9, 1994 [DE] Germany .......................... 44 04 072.5

[51] Int. Cl.$^6$ ................................ B65B 1/30; B65B 3/28; B65B 57/06; B65B 57/14
[52] U.S. Cl. .......................... 141/197; 141/67; 141/114; 141/313; 55/385.1; 264/37; 264/85; 264/572; 425/74
[58] Field of Search ................................ 141/67, 94, 114, 141/197, 313; 55/385.1; 264/37, 85, 526, 528, 572; 425/74

Primary Examiner—Henry J. Recla
Assistant Examiner—Timothy L. Maust
Attorney, Agent, or Firm—Blakely, Sokoloff, Taylor & Zafman

[57] ABSTRACT

The apparatus includes an air compressor (13), which is cooled by direct oil injection, and an air cooler (14) connected downstream of it which serves as a condensate separator. Connected to it is a heat exchanger (18) which is heated by the waste heat from the oil discharged from the air compressor (13). The temperature of the air is raised thereby to a level at which the separators (4) downstream thereof develop their optimum efficiency. The nitrogen flowing out of the separators (4), the purity of which is predetermined by a downstream throttle (3), flows into an inflatable reservoir (5) which is connected to the suction side of a high pressure compressor. The latter discharges into a high pressure storage container which for its part supplies an injection moulding machine. The nitrogen is conveyed in a closed circuit between the injection moulding machine and the inflatable reservoir. The control of the installation ensures that only as much nitrogen need be produced as is necessary to compensate for leakage losses from the circuit.

9 Claims, 2 Drawing Sheets

APPARATUS FOR PRODUCING NITROGEN UNDER HIGH PRESSURE

BACKGROUND OF THE INVENTION

The invention relates to an apparatus for producing nitrogen under high pressure for at least one consumer, particularly for at least one injection moulding machine.

FIELD OF THE INVENTION

The invention is concerned with that type of such apparatus which includes an inflatable reservoir which is connected via a first magnetic valve to a nitrogen source, a high pressure storage container, which is connectable to the consumer, a high pressure compressor, which is connected on the suction side to the reservoir and on the pressure side to the storage container, a control device for the first magnetic valve and the high pressure compressor, the control device including a filling state sensor actuated by the reservoir and a pressure switch connected to the storage container, and including a recycling line, which is connected to the inflatable reservoir and is connectable to the consumer, for the nitrogen expanded in the consumer, whereby the filling state sensor has an upper switching point, at which it starts the high pressure compressor and closes the first magnetic valve, and a lower switching point at which, in dependence on the pressure in the storage container, it either opens the first magnetic valve or switches the high pressure compressor off.

DESCRIPTION OF THE PRIOR ART

Such an apparatus is disclosed in DE 4126676 A1. It is used, in particular, for gas injection in modern injection moulding technology in order to produce hollow spaces in the interior of the injection moulded components. The injection pressure is above 300 bar.

The upper switching point of the filling state sensor corresponds to the substantially filled state of the reservoir and the lower switching point corresponds to the substantially empty state. At the upper switching point the compressor is switched on and the first magnetic valve closed. During the first operational stage, namely during the commencement of operation, the lower switching point of the filling state sensor effects an opening of the first magnetic valve whilst the compressor is running. As soon as the pressure in the storage container has reached a first preset value, the second operational stage begins. The pressure switch closes the first magnetic valve and acts on the lower switching point of the filling state sensor to the effect that it shuts down the compressor when it is activated. If gas now flows through the recycling line into the reservoir and inflates it to the extent that the filling state sensor reaches its upper switching point, the compressor is switched on. The apparatus thus operates in a circuit. This mode of operation is continued until the pressure in the storage container falls below a second value preset at a lower level, whereafter the pressure switch opens the first magnetic valve and the first operational stage recommences.

The nitrogen supply was previously effected by means of a battery of cylinders. Supply bottlenecks can thus occur, even if one keeps generous supplies. An additional factor is that such an operation is uneconomical since the nitrogen is supplied at ca. 200 bar whilst a lower pressure level above atmospheric pressure is sufficient for filling the reservoir.

It is the object of the invention to make the apparatus of the type referred to above independent of a nitrogen supply and at the same time to improve its efficiency.

SUMMARY OF THE INVENTION

In order to solve this object the apparatus in accordance with the invention is characterised in that associated with the first magnetic valve there is a second magnetic valve which is actuated in alternation with it and is connected on the outlet side to the atmosphere via a throttle, that the magnetic valves are connected on the inlet side via an adjustable throttle to at least one nitrogen separator which is supplied by an air compressor, and that associated with the outlet of the separator there is a nitrogen purity sensor which actuates the magnetic valves in addition to the control device.

Nitrogen separators form part of the state of the art. They operate with a membrane and separate atmospheric nitrogen from oxygen. The degree of purity is dependent on the back pressure in the nitrogen line downstream of the separator, on the amount of air passed through the separator and on the operational temperature of the separator. The higher the required purity the lower is the amount supplied.

The degree of purity is preselected in accordance with the invention by the adjustable throttle and monitored by the purity sensor. In the start-up state the first magnetic valve is closed whilst the second magnetic valve adopts its open position. The nitrogen back pressure is then determined by the throttle connected downstream of the second magnetic valve and maintained at a high level. As soon as the desired degree of purity, which can be above 99%, has been reached, the purity sensor switches the two magnetic valves over, if the control device will permit this. The reservoir may then be filled. If the purity sensor indicates that the desired degree of purity is no longer being achieved, the two magnetic valves are switched over so that filling of the reservoir with contaminated nitrogen is prevented. The purity sensor measures the oxygen content of the nitrogen.

The apparatus thus has its own nitrogen supply and is thus independent of deliveries and storage. Its mode of operation is characterised by a high efficiency since the air compressor must merely supply the necessary amount of air at the pressure necessary for operation of the separator and filling of the reservoir. An additional factor is that the purity of the nitrogen can be matched to the respective requirements.

The adjustable throttle provided for this purpose can be manually actuated. Under certain circumstances it is more advantageous if the purity sensor controls the adjustable throttle in dependence on the preselected degree of purity. Furthermore, an alarm function is preferably associated with the purity sensor.

In order to prevent disruptions, which interrupt the production of nitrogen or unacceptably reduce the degree of purity in critical phases, it can be advantageous if an inlet line for the external supply of nitrogen is provided downstream of the separator and if the filling state sensor has a third switching point which is below the lower switching point and at which it switches on the external supply, when the first magnetic valve is open. However, this is purely an emergency precaution since the apparatus operates as substantially as possible in a closed circuit due to the recycling of nitrogen from the consumer.

This closed circuit operation is associated with an additional advantage. In closed circuit operation the first magnetic valve is closed whilst the second magnetic valve adopts its open position. The nitrogen back pressure on the separator is thus determined by the throttle of very narrow cross-section which is connected downstream of the second magnetic valve. This automatically results in an increase in the degree of purity so that the security of the subsequent nitrogen supply is increased. In accordance with a further advantageous feature the filling state sensor has a fourth switching point which is below the third switching point and at which it switches off the high pressure compressor, when the first magnetic valve is open. This is an emergency switching-off function in the event that the inflatable reservoir does not receive sufficient nitrogen either from the separator or from the external supply, in order to supply the high pressure compressor appropriately.

In an important further embodiment of the invention the apparatus is further characterised in that the air compressor is a compressor which is cooled by oil injection and connected downstream of which on the air outlet side there are an air cooler with a condensate trap and, on the oil outlet side, an oil cooler, and that provided in series before the oil cooler and in series after the condensate trap there is a heat exchanger for preheating the cooled air by utilising the waste heat of the oil. The cooling of the compressor, which can be a screw compressor, is effected by the injection of oil into the air to be compressed. Oil and compressed air leave the compressor through separate pathways, whereby, however, a certain amount of oil remains in the air. The latter is subsequently cooled in order to separate this amount of oil together with the water removed from the air as a condensate by means of a filter combination. The oil also needs to be cooled before it is returned into the compressor. The heat liberated is now used to reheat the cooled air and to bring it to that temperature at which the separator develops its optimum efficiency. The necessary energy is thus supplied by the waste heat so that the apparatus operates with a particularly good efficiency.

Since the waste heat is present in excess, it is advantageous that a thermostatic valve acted on by the oil temperature controls the oil flow to the oil cooler and to a bypass line bypassing the oil cooler. The oil flows firstly through the heat exchanger and from there to the thermostatic valve from which it is returned, in dependence on its temperature, via the bypass line directly to the compressor or is previously passed through the oil cooler and further cooled therein. The temperature level of the compressor and thus also that of the heat exchanger is maintained constant in this manner.

It is further advantageous to arrange the heat exchanger in the immediate vicinity of the separator to utilise the radiated heat. The separator is thus additionally externally heated, again making use of the waste heat produced from the oil from the compressor.

Preferably connected downstream of the condensate trap on the condensate outlet side is an oil-water separator. This serves to remove the condensate produced when cooling the compressed air.

All those combinations of the features in accordance with the invention which differ from the combinations discussed above are disclosed as being of importance to the invention.

The invention will be explained below in more detail with reference to a preferred exemplary embodiment in conjunction with the accompanying drawings.

DESCRIPTION OF THE PREFERRED EMBODIMENT

Figure 1:
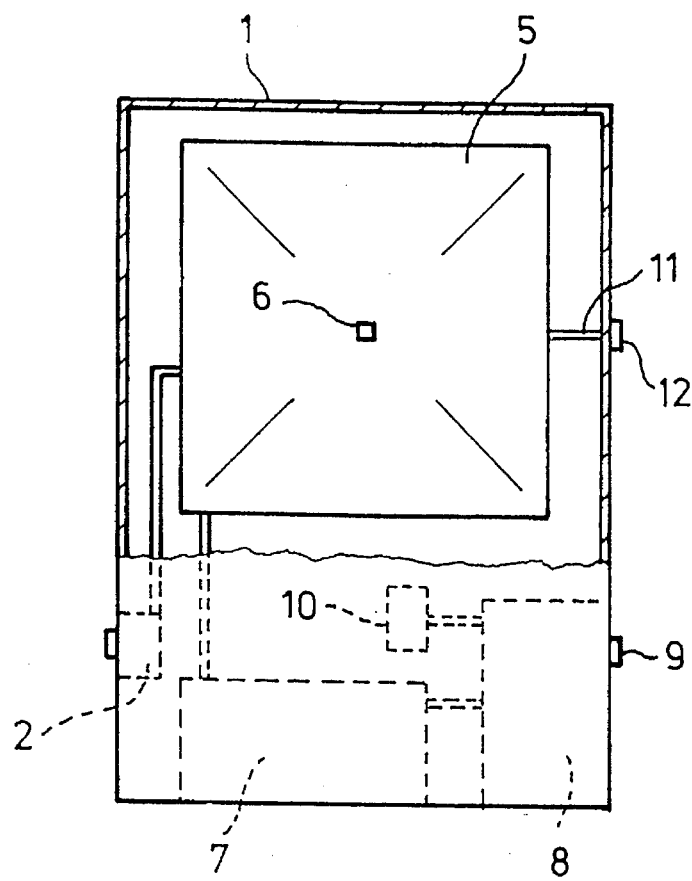
FIG. 1 is a partially broken away schematic front view of the apparatus.

As shown in FIG. 1, the apparatus has a housing 1 which contains, amongst other things, the sub-assemblies which are shown in part schematically. A first magnetic valve 2 is connected on the inlet side with the interposition of an adjustable throttle 3 to a battery of membrane separators 4—see FIGS. 2 and 3. The nitrogen flows from the first magnetic valve 2 into an inflatable reservoir 5 which is provided with a filling state sensor 6. The reservoir 5 is connected to the suction side of a high pressure compressor 7 which discharges into a high pressure storage container 8. The storage container 8 may be connected by means of a connection 9 to a consumer, in this case to an injection moulding machine. The pressure in the storage container 8 acts on a pressure switch 10.

A recycling line 11 is also provided which may also be connected to the injection moulding machine by means of a connection 12 and serves to pass nitrogen, which has been expanded in the injection moulding machine, back into the inflatable reservoir 5.

The control of the device, as so far described, is effected by means of the filling state sensor 6 and the pressure switch 10. The control lines have been omitted from the drawings for the sake of clarity.

When commencing operation, the nitrogen producing unit is put into operation first, provided that the pressure in the storage container 8 is below a set upper pressure value. As soon as the desired degree of purity has been achieved, the first magnetic valve 2 opens. Nitrogen is then blown into the reservoir 5 at approximately atmospheric pressure. When the filling state sensor 6 reaches its upper switching point, operation of the high pressure compressor 7 is commenced whilst the first magnetic valve 2 remains open, whereby the filling state of the reservoir 5 decreases. Provided that the volume of gas withdrawn is larger than the volume supplied with the predetermined purity by the nitrogen producing unit, the filling state sensor 6 reaches its lower switching point whereby, if the nitrogen producing unit continues to operate, the high pressure compressor is switched off so that the reservoir 5 fills up again. This occurs also if the volume of gas drawn off is smaller than the volume supplied by the nitrogen producing unit. As soon as the filling state sensor 6 reaches its upper switching point again, the high pressure compressor is switched on again, if it had been switched off. Furthermore, the first magnetic valve 2 is closed whilst a second magnetic valve 20 (FIG. 3) moves into its open position. No more nitrogen is fed into the reservoir 5 during this phase. An increase in the degree of purity is produced at the same time due to the discharge via the second magnetic valve 20 and a throttle 21 with a relatively small opening (FIG. 3) connected downstream. As soon as the high pressure compressor 7 has again emptied the reservoir 5 to the extent that the filling state sensor 6 reaches its lower switching point, the two magnetic valves 2 and 20 switch over again. This working cycle continues until the pressure switch indicates that the set upper pressure has been reached in the storage container 8. The first magnetic valve 2 is then closed and at the same time the nitrogen producing unit is switched off. Furthermore, the compressor 7 is shut down as soon as the filling state sensor 6 reaches its lower switching point. The periodic filling of the inflatable reservoir 5 is now effected via the recovery line 11 so that the nitrogen is thus conducted in a circuit. As soon as the pressure in the storage container 8 falls below a lower preset value, the pressure switch 10 switches back to the start-up state.

The operation is thus largely in a closed circuit, whereby gas only need be withdrawn from the separators 4 when the inevitable leakage losses have caused a corresponding pressure reduction in the storage container 8. The apparatus operates with high efficiency and with a simple construction and economical manufacture.

Figure 3:
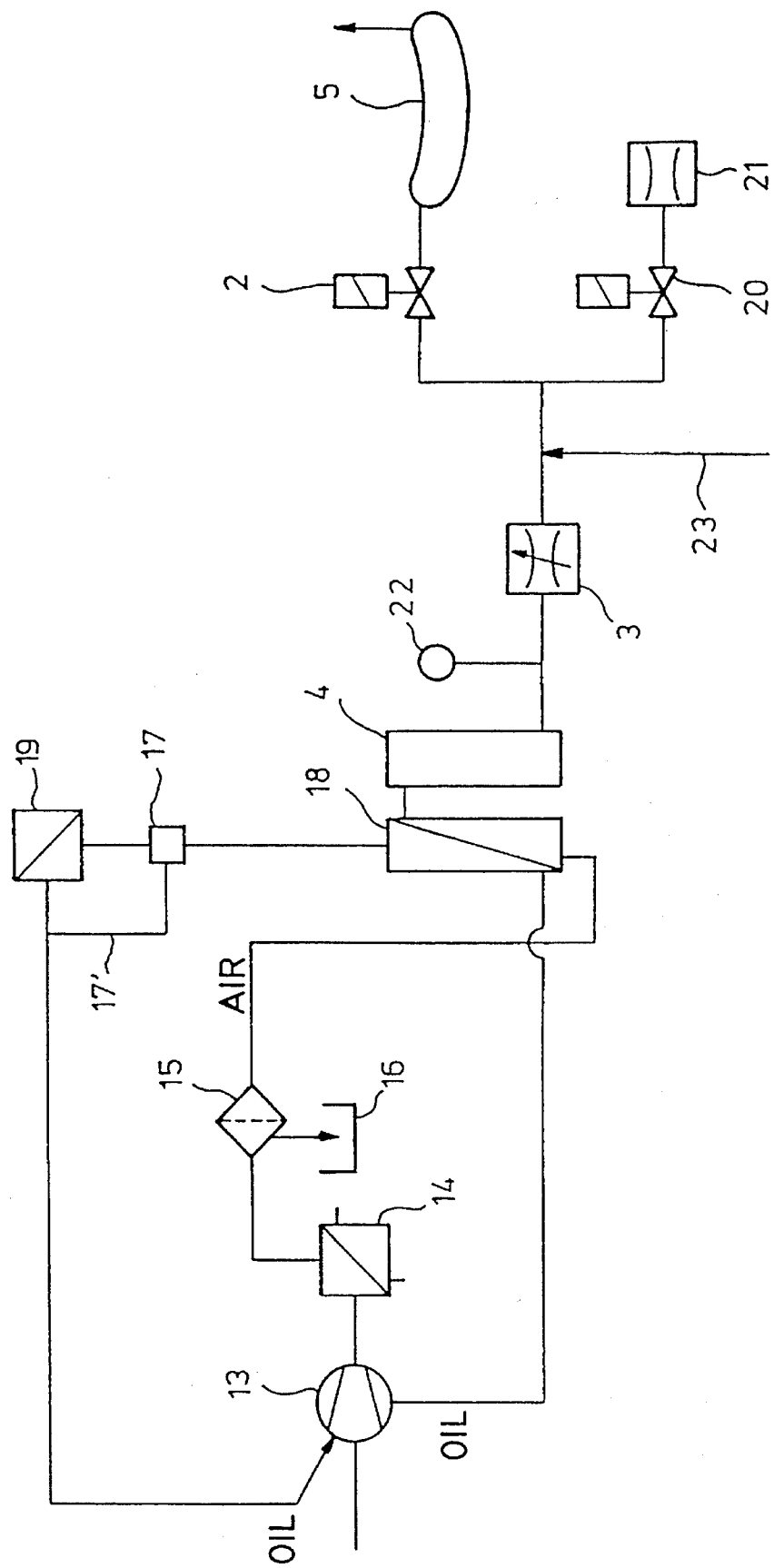
FIG. 3 is a simplified block circuit diagram of the portion of the apparatus of FIG. 1.

FIG. 3 is a schematic view of the portion of the apparatus concerned with the production of nitrogen.

Air is compressed in a low pressure air compressor 13 and cooled in an air cooler 14 in order to be subsequently cleaned in a condensate trap 15 constructed as a filter combination. The condensate flows into an oil-water separator 16.

Figure 2:
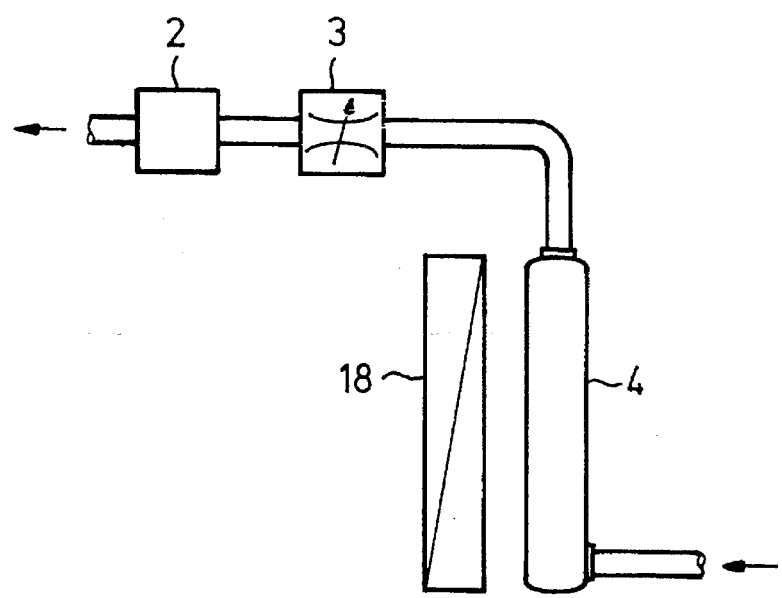
FIG. 2 shows a detail of the apparatus of FIG. 1.

The air compressor 13 is a screw compressor which is cooled by the injection of oil. The heated oil flows to a heat exchanger 18 which, as may be seen in FIG. 2, is arranged directly ill front of the separators 4 in order to utilise the radiation heat. The heat exchanger 18 serves to heat the cooled air before it flows into the separators 4. By using the waste heat from the oil the separators 4 operate with optimum efficiency. After the heat exchanger 18 the oil flows to a thermostatic valve 17 which, during a short heating phase, conducts the oil via a bypass line 17' directly to the air compressor 13. After the heating phase the oil is conducted through a conventional oil cooler 19 and cooled therein so that the temperature level is maintained constant at a value which is the optimum for the separators 4 and the air compressor 13.

Adjacent to the separators 4 is the adjustable throttle 3 and adjacent to the latter is the first magnetic valve 2. Connected in parallel with the first magnetic valve 2 is the second magnetic valve 20, followed by the throttle 21, which discharges into the atmosphere. Both magnetic valves 2 and 20 are subject to the control by the filling state sensor 6 and are actuated simultaneously in opposite senses.

The degree of purity of the nitrogen is set at the adjustable throttle 3. The lower the throughput, the higher is the degree of purity. Monitoring is performed by a purity sensor 22 which may be associated with an alarm function. So long as the degree of purity has not reached the set value in the start-up phase, the first magnetic valve 2 is closed whilst the second magnetic valve 20 adopts an open position. The throttle 21, whose cross-section is maintained small, determines the back pressure for the separators 4. When the purity sensor indicates the unit is ready for operation, the magnetic valves 2 and 20 both switch over. They are coupled together for this purpose. They switch over again when the purity sensor 22 detects a reduction of the degree of purity during operation below the desired value.

In the present case, the adjustable throttle 3 is manually operated. It can, however, also be controlled by means of the purity sensor 22.

As soon as the filling state sensor 6 on the inflatable reservoir 5 requires the first magnetic valve 2 to close, the second magnetic valve 20 is opened simultaneously. The nitrogen is then discharged into the atmosphere but under an increased back pressure determined by the throttle 21 so that the installation automatically increases the purity level.

As is schematically indicated by the conduit 23, the possibility of the external supply of nitrogen is provided in order to compensate for emergencies, the occurrence of which is, however, scarcely anticipated since the installation operates in a circuit between the inflatable reservoir and the consumer. The external supply is controlled by the filling state sensor 6 of the inflatable reservoir 5. The filling state sensor 6 has for this purpose a third switching point ("bag empty"), which is below the lower switching point. The arrangement of the third switching point below the lower switching point ensures that the first magnetic valve is open and the second magnetic valve 20 adopts its closed position. The latter applies also to a fourth switching point of the filling state sensor 6 which is arranged below the third switching point. The high pressure compressor 7 is switched off at the fourth switching point since it can no longer be adequately supplied with nitrogen.

Within the scope of the invention there are numerous possibilities for modifications. Thus air compressors other than screw compressors can be used so long as sufficient waste heat is made available via the oil. Furthermore, the throttle 21 can be adjustable in order to alter the back pressure for the separators when blowing off, optionally in dependence on information supplied by the purity sensor. The arrangement of the heat exchanger directly in front of the separators can be dispensed with if their efficiency achieves the optimum as a result only of preheating the air. The number of the separators is not of critical importance; it depends on the respective operating parameters.

I claim:

1. Apparatus for producing nitrogen under high pressure for at least one consumer, particularly for at least one injection moulding machine, including an inflatable reservoir (5) which is connected via a first magnetic valve (2) to a nitrogen source, a high pressure storage container (8), which is connectable to the consumer, a high pressure compressor (7), which is connected on the suction side to the reservoir and on the pressure side to the storage container, a control device for the first magnetic valve and the high pressure compressor, the control device including a filling state sensor (6) actuated by the reservoir and a pressure switch (10) connected to the storage container, and including a recycling line (11), which is connected to the inflatable reservoir (5) and is connectable to the consumer, for the nitrogen expanded in the consumer, whereby the filling state sensor (6) has an upper switching point, at which it starts the high pressure compressor (7) anti closes the first magnetic valve (2), and a lower switching point at which, in dependence on the pressure in the storage container (8), it either opens the first magnetic valve (2) or switches the high pressure compressor (7) off, characterised in that associated with the first magnetic valve (2) there is a second magnetic valve (20) which is actuated in alternation with it and is connected on the outlet side to the atmosphere via a throttle (21), that the magnetic valves (2,20) are connected on the inlet side via an adjustable throttle (3) to at least one nitrogen separator (4) which is supplied by an air compressor (13), and that associated with the outlet of the separator (4) there is a nitrogen purity sensor (22) which actuates the magnetic valves (2,20) in addition to the control device.

2. Apparatus as claimed in claim 1, characterised in that the purity sensor (22) controls the adjustable throttle (3).

3. Apparatus as claimed in claim 1 or 2, characterised in that an alarm function is associated with the purity sensor (22).

4. Apparatus as claimed in claim 1, characterised in that provided downstream of the separator (4) there is an inlet line for the external supply of nitrogen and that the filling state sensor (6) has a third switching point which is below the lower switching point and at which it switches on the external supply of nitrogen, when the first magnetic valve (2) is open.

5. Apparatus as claimed in claim 4, characterised in that the filling state sensor (6) has a fourth switching point which is below the third switching point and at which it switches off the high pressure compressor (7), when the first magnetic valve (2) is open.

6. Apparatus as claimed in claim 1, characterised in that the air compressor (13) is a compressor which is cooled by oil injection and connected downstream of which on the air outlet side there is an air cooler (14) with a condensate trap (15) and, on the oil outlet side, an oil cooler (19), and that provided in series before the oil cooler (19) and in series after the condensate trap (15) there is a heat exchanger (18) for preheating the cooled air by utilising the waste heat of the oil.

7. Apparatus as claimed in claim 6, characterised in that a thermostatic valve actuated on by the oil temperature controls the air flow to the oil cooler (19) and to a bypass line (17) bypassing the oil cooler.

8. Apparatus as claimed in claim 6 or 7, characterised in that the heat exchanger (18) is arranged in the immediate vicinity of the separator (4) to utilise the radiated heat.

9. Apparatus as claimed in claim 6 or 7, characterised in that an oil-water separator (16) is connected downstream of the condensate trap (15).

* * * * *

UNITED STATES PATENT AND TRADEMARK OFFICE
CERTIFICATE OF CORRECTION

PATENT NO. : 5,558,141
DATED : September 24, 1996
INVENTOR(S) : Dannöhl It is certified that error appears in the above-identified patent and that said Letters Patent is hereby corrected as shown below:

In column 6, claim 1 at line 48, please delete " anti " and insert -- and --.

Signed and Sealed this

Ninth Day of September, 1997

Attest:

BRUCE LEHMAN

*Attesting Officer*   Commissioner of Patents and Trademarks